United States Patent Office 3,007,297
Patented Nov. 7, 1961

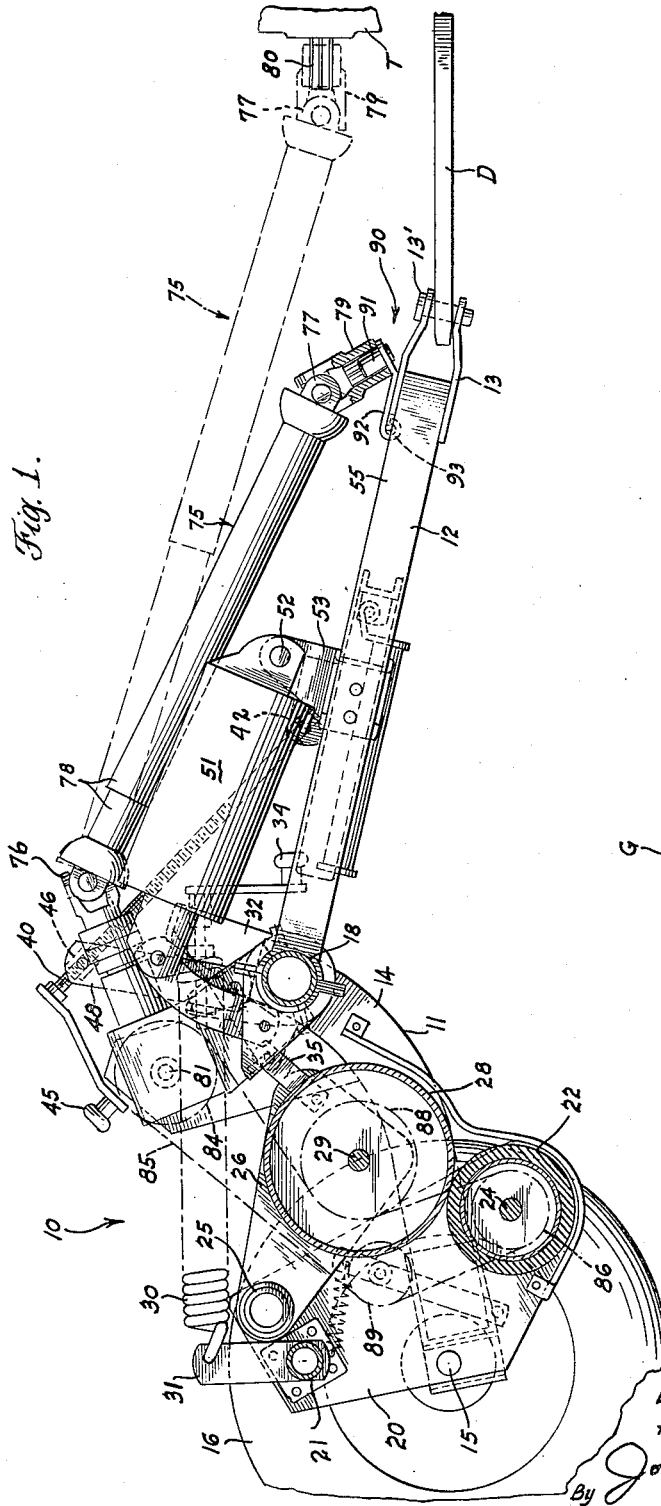

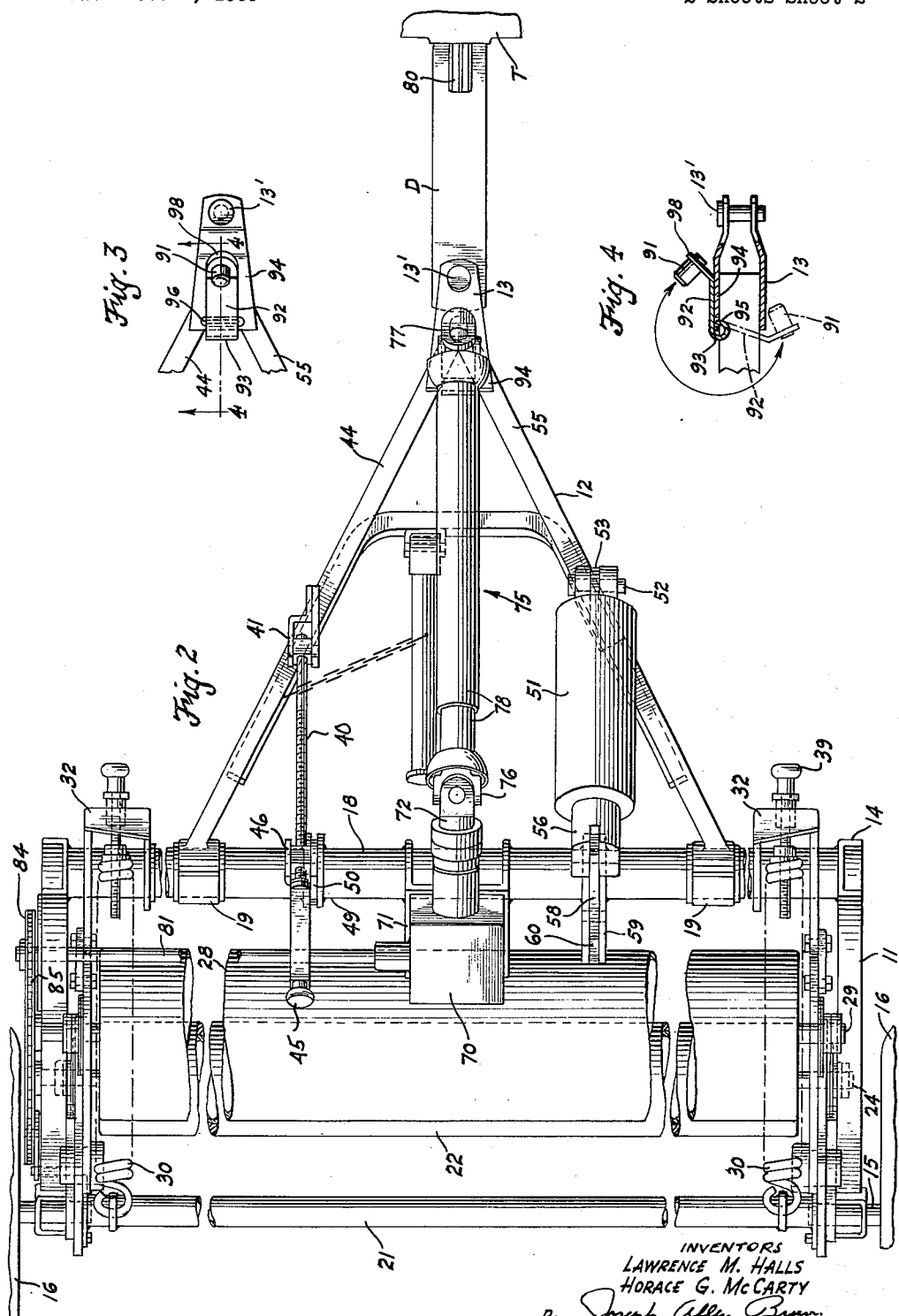

3,007,297
HAY CONDITIONER
Lawrence M. Halls and Horace G. McCarty, New Holland, Pa., assignors to Sperry Rand Corporation, New Holland, Pa., a corporation of Delaware
Filed Dec. 8, 1959, Ser. No. 858,281
9 Claims. (Cl. 56—1)

The present invention relates generally to hay conditioning implements and more particularly to means for supporting the coupling member of a power take-off assembly of a hay conditioner when such coupling member is disconnected from the output shaft of a vehicle towing the implement.

One type of hay conditioner has a pair of cooperative crusher rolls mounted one above the other, the lower roll performing the dual function of a crushing roll and a pickup. The rolls are of considerable length and extend transversely between two ground wheels. The lower roll, at least, is made of rubber. Both rolls are power driven, power being derived from a power take-off assembly having a coupling member connectable to the output shaft of the vehicle towing the implement. The drive to the rolls includes a driven shaft. When such shaft is rotated by power from the power assembly, the rolls are rotated. However, when the output shaft of the vehicle is shut off, it operates through the coupling, assembly and driven shaft to lock the rolls in stopped position. When the implement is being towed from one place to another, the fact that the rolls are locked is undesirable.

When the implement is being transported from one place to another, the lower roll is elevated to maximum height to provide as much ground clearance as possible. However, because of the wide wheel spacing and high crowned roads which are often found in rural areas, the lower roll may occasionally come in contact with the road. If the roll is locked against rotation, then when the roll engages the road it will scrape along the road rather than roll over it. This will produce a marring of the periphery of the roll and otherwise damage it.

One object of this invention is to provide a hay conditioner in which the conditioning rolls are freely rotatable when the machine is not in use and being transported from one place to another.

Another object of this invention is to provide, in a hay conditioner of the character described, means for carrying the coupling member of a power take-off assembly when such member is disconnected from the output shaft of the vehicle towing the conditioner.

Another object of this invention is to provide, in a hay conditioner of the character described, carrier means which will support the power take-off assembly coupling member without placing the assembly and rolls in locked position.

Another object of this invention is to provide carrier means of the character described so disposed that there is little danger of the coupling member falling off of the carrier when the implement is in transport.

A further object of this invention is to provide in a hay conditioner having a frame and a draft member pivotal relative to each other, means for carrying the coupling member of a power take-off assembly when such member is disconnected from the output shaft of the vehicle towing the conditioner, the assembly and carrier means being so disposed relative to the frame and draft means that when the power take-off member is mounted on the carrier means, the frame and draft means are prevented from pivoting relative to each other in one direction.

A still further object of this invention is to provide carrier means for the coupling member on a power take-off assembly which is of simple construction and very moderate cost.

Other objects of this invention will be apparent here and after from the specification and from the recital in the appended claims.

In the drawings:

FIGURE 1 is a part side elevation part section of a hay conditioner having means thereon for supporting the coupling member of the power take-off assembly constructed according to this invention. Such section is taken on the line 1—1 of FIGURE 2 looking in the direction of the arrows and showing the conditioner rolls elevated to road transport position;

FIGURE 2 is a fragmentary plan view of FIGURE 1;

FIGURE 3 is a fragmentary plan view of the forward end of the hitch member and showing the carrier means mounted thereon for supporting the coupling member of the power take-off assembly;

FIGURE 4 is the section taken on the line 4—4 of FIGURE 2 looking in the direction of the arrows.

Referring now to the drawings by numerals of reference, 10 denotes a hay conditioner comprising a frame 11 and draft means 12. Frame 11 comprises fore and aft extending laterally spaced frame members 14 the rear ends of which supports spindle 15 for the ground wheels 16. The forward ends of frame members 14 are connected by a cross member 18 to which the rearward end of the draft means 12 is pivotally connected at 19. The forward end of draft means 12 has a hitch 13 connectable to the drawbar D of a tractor T by pin 13'.

Fixedly connected to frame members 14 are vertically extending, laterally spaced side plates 20 which extend above and below frame 11. The upper ends of the side plates 20 are inter-connected by a brace member 21. Journalled in the bottom portions of side plates 20 is a crusher roll 22 which also constitutes the pickup for the machine. Roll 22 has stub shafts 24 at its ends. The upper ends of side plates 20 carry pivot members 25 which carry downwardly and forwardly extending support arms 26 which rotatably carry an upper crusher roll 28. The upper crusher roll has a stub shaft 29 at each end.

When viewed as shown in FIGURE 1, the lower roll is adapted to be rotated in a counter-clockwise direction while the upper roll rotates clockwise. The lower roll is covered with rubber while the upper roll is made of steel. The rubber in the lower roll provides better friction for picking up material from the ground G. Further, the resiliency of the roll in combination with the rigid steel upper roll provides a good crushing action without shattering the leaves of the crop material being conditioned.

Upper roll 28 is swingable away from the lower roll 22 about the axis of the pivot support members 25. The weight of the roll holds it normally against the periphery of lower roll 22. However, it will move away from the roll responsive to the crop material passing between the rolls. To increase the hold down effect of the upper roll, hold-down springs 30 are provided at each side of the machine. Such springs extend in a fore and aft direction having rearward ends connected to fixed support members 31 and having forward ends attached to levers 32 pivotally mounted on cross member 18. Conventional crank adjustment means 34 is provided for regulating the tension on the springs. The lever arms 32 are connected to the support members 26 by means of links 35. When the upper roll moves away from the lower roll, force is transmitted through the links 35 to the lever arms 32 to pivot them. Pivoting of the lever arms is resisted by springs 30 thereby providing a hold-down force on roll 28.

In the drawings, the hay conditioner rolls are shown in road transport position with the rolls elevated to maximum height to provide as much clearance as possible with the ground G. The adjustment of the rolls relative to the ground is achieved by pivoting the draft means 12 relative to the frame 11. This is accomplished by means of a threaded crank rod 40 pivotally connected at 42 to one leg 44 of the draft means 12. The opposite end of rod 40 has a crank handle 45. Threaded unto the rod 40 is a sleeve 46 connected to the upper end of a lever arm 48 pivotally connected to a control plate 49 welded to the cross member 18 and extending radially therefrom. Plate 49 has a stop member 50 thereon which engages one side edge of the lever 48 and prevents pivotal movement of the plate 49 in one direction.

When the crank handle 49 is rotated, sleeve 46 moves up or down on rod 40, depending on the direction rotation of the crank. Lever arm 48 is thus pivoted in either a clockwise or counter-clockwise direction. Such pivoting of the lever operates through the stop 50 to pivot the plate 49. The linkage is such that the draft means 12 and frame 11 are pivoted relative to each other about the axis of cross member 18 producing a scissoring action which raises the lower roll from the ground or lowers it as the case may be.

Pivoting of the frame 11 relative to the draft means 12 can also be achieved by means of a hydraulic cylinder 51. Cylinder 51 is pivotally connected at 52 to a support 53 carried on another leg 55 of the draft means 12. Cylinder 51 has a piston rod 56 connected to a lever arm 58 which is in turn pivotally connected to a control plate 59 having a stop member 60. The control plate 59 is fixed to the cross member 18. When the hydraulic means is actuated, the frame 11 and draft means 12 are pivoted relative to each other in the same manner as when the crank handle 45 is used. The hydraulic means is provided so that the crusher rolls can be adjusted relative to the ground without the operator having to leave the machine. Further, the crank means provides means whereby the lowermost point of adjustment on the lower roll can be established.

For driving the crusher rolls, a gear box 70 is provided. Gear box 70 is mounted on a pedestal 71 extending upwardly from the cross member 18. Power is supplied to the gear box 70 through an input shaft 72 connected to a power take-off assembly 75 through universal joint 76. The power take-off assembly comprises telescopic shafts, not shown, within telescopic members 78 extending in a fore and aft direction above the draft means 12. The forward end of the power take-off assembly has a universal joint 77 and a quick coupling member 79 of conventional design. The coupling member 79 comprises an internally splined sleeve which fits unto the power output shaft 80 of a tractor T. The splines within coupling member 79 mesh with the splines on the periphery of shaft 80 whereby when the output shaft of the tractor is rotated, power is transmitted through the power take-off assembly to the gear box 70. The gear box 70 has an output driven shaft 81 connected to a sprocket 84 around which an endless chain 85 extends. The lower crusher roll 22 has a sprocket 86 and the upper roll 28 has a sprocket 88. The endless chain 85 extends around sprocket 86 and has driving engagement with sprocket 88. A chain tightener 89 is provided as shown in FIGURE 1.

When the coupling member 79 is connected to the output shaft 80 of the tractor T, a positive drive connection is transmitted through to the crusher rolls 22 and 28 and they are rotated when shaft 80 is rotating. When the shaft 80 is stopped, it locks all of the components connected to it in stopped position. Thus, when the coupling 79 is connected to the shaft 80 and the shaft 80 is stopped, the rolls 22 and 28 are locked against movement. When the machine is being towed on a road, high spots in the road, or if the road is highly crowned, may result in the lower rubber roll 22 coming into engagement with the road. This problem is aggravated somewhat by the considerable spacing between the ground wheels 16. If the lower roll remained in locked condition, any engagement of the lower roll with the ground would produce a scraping of the lower roll on the road.

To prevent this from happening, carrier means 90 is provided for supporting quick coupling member 79 when it is disconnected from the output shaft 80. Means 90 comprises a carrier member 91 in the form of a stud shaft which is connected to a strap 92. Strap 92 has a rearward end 93 (FIGURES 3 and 4) pivotally connected to the hitch plate 94 by means of a curved over portion 95 which projects through a slot 96 in the hitch plate. The slot 96 is of such size that it provides a considerable clearance between strap 92 and the hitch plate. Thus, the connection is substantially a universal connection allowing the strap to pivot in all directions relative to its support.

Strap 92 has a portion 98 which extends angularly relative to the draft means 12 and the stud shaft 91 extends perpendicular thereto. The stud shaft is slanted upwardly and rearwardly in such manner so as to equalize the operating angles of the universal joints 76 and 77 of the power take-off assembly 75 to thereby allow the parts of the assembly to rotate when the assembly is disconnected from the shaft 80.

The bore of the coupling member 79 has a diameter only slightly greater than the outer diameter of the stud shaft 91 to provide clearance between the parts. The coupling member 79 is thus freely rotatable on the stud shaft when the machine is being transported and when member 79 is on the stud 91 the lower roll 22 is free to rotate. If the roll engages the ground it will roll over it instead of scrape along the surface. The rotation of roll 22 is transmitted through the chain 85 and power take-off assembly 75 to coupling member 79 to rotate the member on the stud. Thus, when the coupling member is connected to the shaft 80 power may be transmitted to the rolls to rotate them. When the coupling member 79 is disconnected and mounted on the stud 91 the lower roll is free to rotate responsive to ground engagement.

It will also be noted that when the power take-off assembly is in operative driving position as shown on dotted lines in FIGURE 1, the sections 78 are extended. However, when the coupling member 79 is mounted on the stud shaft 91, the power take-off assembly sections 78 are telescoped to retracted position. This is important because it minimizes the chances of the coupling 79 jumping off of the stud shaft 91 when the implement is in transport. Thus, bouncing of the implement frame as the machine moves along will not displace the coupling member from the shaft. Still further, the stud extends at such an angle relative to the power take-off assembly that sections 78 have to be fully retracted and then extended slightly to get coupling 79 on stud 91, a procedure which has to be done in reverse to bounce the coupling off of the stud when driving over rough ground.

When not in use, the mounting bracket 92 can be swung downwardly to the position shown in FIGURE 4 to provide greater operating clearance relative to the power take-off assembly 75. In this out-of-the-way position, it does not in any way interfere with the operation of the machine.

While this invention has been described in connection with a particular embodiment thereof, it will be understood that it is capable of further modification, and this application is intended to cover any variations, uses or adaptations of the invention following in general, the principles of this invention and including such departures as come within known or customary practice in the art to which the invention pertains and as fall within the scope of the invention or the limits of the appended claims.

Having thus described our invention, what we claim is:

1. A hay conditioner comprising, in combination, a mobile frame having draft means connectable to a prime mover, a pickup roll rotatably mounted on said frame, a driven shaft supported on said frame and drivingly connected to said roll whereby when said shaft is rotated said roll rotates and conversely when said roll is rotated said shaft rotates, a power take-off assembly carried on said frame and connected to said shaft, said assembly including a coupling member connectable to a power output shaft of said prime mover, and means supporting said coupling member when disconnected from said output shaft comprising a support member connected to said frame, carrier means on said support member rotatably connecting the support member and said coupling member, said coupling member having portions engaging said carrier means and rotatable relative thereto when in engagement therewith.

2. A hay conditioner as recited in claim 1 wherein said power take-off assembly includes a pair of extendable and retractable telescopic members one of which has said coupling member connected to it, said carrier member being connected to said frame in a position such that said telescopic members have to be retracted to mount said coupling member on said carrier member.

3. A hay conditioner as recited in claim 2 wherein said carrier member extends in such a direction relative to said power take-off assembly that after said telescopic members have been retracted they have to be partially extended to mount the coupling members on the carrier member.

4. A hay conditioner as recited in claim 1 wherein said carrier member comprises a cylindrical stud which projects into said coupling member when the coupling member is mounted thereon.

5. A hay conditioner as recited in claim 4 wherein said power take-off assembly includes two universal joints, and said stud is mounted at such an angle relative to said frame that the angles of said joints are generally equalized.

6. A hay conditioner as recited in claim 4 wherein said coupling member has a bore of a given diameter, and said stud has an outside diameter slightly less than said given diameter to provide clearance between the parts.

7. A hay conditioner as recited in claim 1 wherein said carrier member is affixed to a strap and means is provided for universally connecting said strap to said frame.

8. A hay conditioner as recited in claim 7 wherein said strap is selectively manually positionable in a first operating position and a second inoperative position, said second position being used when said coupling member is connected to said power output shaft.

9. A hay conditioner comprising, in combination, a mobile frame, a draft member pivotally connected to said frame and connectable to a prime mover, a pickup roll rotatably mounted on said frame, a driver shaft rotatably mounted on said frame and in fixed position relative thereto, means drivingly connecting said shaft to said roll whereby when said shaft is rotated said roll rotates, a power take-off assembly carried on said draft member and including a pair of drive members pivotally connected together, means connecting one of said members to said driven shaft and in fixed position relative thereto, a coupling member pivotally connected to the other of said members and connectable to an output shaft of said prime mover, and means supporting said coupling member when disconnected from said output shaft comprising a support member connected to said draft member, carrier means on said support member rotatably connecting the support member and said coupling member, said coupling member having portions engaging said carrier means and being rotatable relative thereto when in engagement therewith, the positions of said drive members being such relative to said frame and draft member that pivotal movement of the frame and draft member relative to each other in one direction is prevented when said coupling member is connected to said carrier means.

References Cited in the file of this patent

UNITED STATES PATENTS

| | | |
|---|---|---|
| 2,885,015 | Koch et al. | May 5, 1959 |
| 2,911,780 | Brady | Nov. 10, 1959 |